United States Patent
Nitz et al.

(10) Patent No.: US 8,452,523 B2
(45) Date of Patent: May 28, 2013

(54) METHOD OF CONTROLLING AN AUTOMATIC SWITCH-OFF AND SWITCH-ON PROCEDURE OF A DRIVE UNIT IN A MOTOR VEHICLE

(75) Inventors: Gregor Nitz, Olching (DE); Felix Klanner, Munich (DE); Klaas Kunze, Munich (DE); Christian Raubitschek, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/438,497

(22) Filed: Apr. 3, 2012

(65) Prior Publication Data

US 2012/0191330 A1    Jul. 26, 2012

Related U.S. Application Data

(63) Continuation of application No. PCT/EP2010/065789, filed on Oct. 20, 2010.

(30) Foreign Application Priority Data

Oct. 23, 2009  (DE) .......................... 10 2009 050 520

(51) Int. Cl.
*F02N 11/08*  (2006.01)
*F02D 41/26*  (2006.01)

(52) U.S. Cl.
USPC ...... 701/112; 701/113; 123/179.3; 123/179.4

(58) Field of Classification Search
USPC ................. 701/113, 112; 123/179.3, 179.4
See application file for complete search history.

(56) References Cited

U.S. PATENT DOCUMENTS

| | | | |
|---|---|---|---|
| 4,034,335 A * | 7/1977 | Harazoe et al. | 123/397 |
| 4,286,683 A * | 9/1981 | Zeigner et al. | 180/54.1 |
| 6,068,447 A * | 5/2000 | Foege | 417/12 |
| 6,526,931 B1 | 3/2003 | Vilou | |
| 7,079,940 B2 * | 7/2006 | Scholt et al. | 701/112 |
| 2002/0074173 A1 | 6/2002 | Morimoto et al. | |
| 2003/0029406 A1 | 2/2003 | Weiss | |

(Continued)

FOREIGN PATENT DOCUMENTS

| | | |
|---|---|---|
| DE | 100 30 290 A1 | 8/2001 |
| DE | 101 61 343 A1 | 7/2002 |

(Continued)

OTHER PUBLICATIONS

Neunzig et al. "Potentials of Forward Looking Driver Assistance in Reduction of Fuel Consumption" 2002, pp. 1-34.

(Continued)

*Primary Examiner* — Hai Huynh
(74) *Attorney, Agent, or Firm* — Crowell & Moring LLP

(57) ABSTRACT

A method of controlling an automatic switch-off and switch-on procedure of a drive unit in a motor vehicle via a start-stop device is provided, by which, when the motor vehicle stops, the drive unit is automatically switched off if predefined switch-off conditions have been met, and by which an automatically switched-off drive unit is automatically switched on if at least one driver-side or system-side switch-on request is made. When a system-side switch-on request takes place, the automatic switch-on procedure will be suppressed at least temporarily if a delay condition exists.

18 Claims, 1 Drawing Sheet

U.S. PATENT DOCUMENTS

| | | |
|---|---|---|
| 2004/0088658 A1 | 5/2004 | Minda |
| 2007/0233358 A1 | 10/2007 | Celisse et al. |
| 2008/0172170 A1 | 7/2008 | Lecole et al. |
| 2012/0123666 A1* | 5/2012 | Stoffels et al. ............... 701/113 |

FOREIGN PATENT DOCUMENTS

| | | |
|---|---|---|
| DE | 101 39 595 A1 | 2/2003 |
| DE | 20 2004 003 215 U1 | 5/2004 |
| DE | 102 61 343 A1 | 5/2004 |
| EP | 1 475 265 B1 | 1/2007 |
| JP | 2003-74688 A | 3/2003 |
| JP | 2004-84484 A | 3/2004 |
| JP | 2007-99030 A | 4/2007 |
| JP | 2009-52416 A | 3/2009 |
| WO | WO 03/001055 A1 | 1/2003 |

OTHER PUBLICATIONS

International Search Report dated Apr. 12, 2011 with English translation (six (6) pages).

German Search Report dated Aug. 6, 2010 with partial English translation (nine (9) pages).

* cited by examiner

METHOD OF CONTROLLING AN AUTOMATIC SWITCH-OFF AND SWITCH-ON PROCEDURE OF A DRIVE UNIT IN A MOTOR VEHICLE

CROSS-REFERENCE TO RELATED APPLICATIONS

This application is a continuation of PCT International Application No. PCT/EP2010/065789, filed Oct. 20, 2009, which claims priority under 35 U.S.C. §119 from German Patent Application No. DE 10 2009 050 520.2, filed Oct. 23, 2009, the entire disclosures of which are herein expressly incorporated by reference.

BACKGROUND AND SUMMARY OF THE INVENTION

The invention relates to a method for controlling an automatic switch-off and switch-on procedure of a drive unit in a motor vehicle using a start-stop device.

In order to reduce fuel consumption and pollutant emissions, methods and systems are currently being developed and partly already in use which automatically switch off the internal-combustion engine of a motor vehicle under certain conditions or if preset switch-off conditions exist, and automatically switch it on again if preset switch-on conditions or switch-on requests exist. Such methods and systems, often referred to as start-stop devices, are suitable mainly for city traffic for reducing fuel consumption because, in city traffic, the vehicle often comes to a stop at traffic lights or as a result of traffic, and the operation of the internal-combustion engine is not required.

Thus, an automatic stop-and-start control device for an internal-combustion engine is known from German Patent document DE 101 61 343 A1, wherein the control device carries out corresponding measures for switching off the internal-combustion engine if all mentioned switch-off conditions have been met. For example, the speed of the vehicle has to be below a given limit value; no gear should be engaged in the case of manual transmissions; and, in the case of automatic-transmission vehicles, the gear shift position of the transmission should be in neutral.

Furthermore, German Patent document DE 100 30 290 A1 also discloses a method and a system for the automatic switching-off and restarting of an internal-combustion engine. In this case, an automatic switch-off is prevented when the charge state of the battery of the vehicle is below a preset blocking threshold. As further switch-off conditions, it is also checked whether the vehicle speed is below a preset limit value, whether the transmission is idling and whether the gas pedal is in an inoperative position. A switching-on of the drive unit takes place as soon as a switch-on request is present.

Currently, systems are still in the research stage which link vehicles mutually and with their surroundings by way of a communications channel. Thus, for example, traffic lights equipped with this technology can transmit their current state and a forecast of the point-in-time of their next change of state. A vehicle receiving these data can then generate a corresponding display or directly intervene in the drive control corresponding to the data.

When an above-mentioned automatic start-stop system is used, it is contemplated that the driver stops at a traffic light and disengages the gear, whereupon the engine is automatically switched off although the traffic light changes back to green shortly thereafter. Many drivers therefore now try to release the accelerator early when a red light is recognized in order to roll toward the traffic light while coasting. However, since the change of state of the traffic light is unknown, an optimal—favorable with respect to consumption—drive control is often difficult for the driver. This is further influenced by the presence of additional vehicles in one's own traffic lane.

German Patent document DE 202004003215U1 discloses a start-stop system wherein the traffic light state data are taken into account such that a holding duration is estimated and, as a function of the forecast, an automatic stop is initiated or prevented.

From European Patent document EP 1 475 265 B1, a method of operating a vehicle is known whereby, as a function of detected objects (including traffic lights), the speed and the operating mode of the engine is automatically adapted. Furthermore, the publication "Potentials of Forward Looking Driver Assistance in Reduction of Fuel Consumption" by Neunzig and Benmimoun, 2002, also indicates various concepts for reducing consumption while taking into account many different environmental data. In particular, in this case, the speed is correspondingly adapted as a function of the available vehicle-external data or the engine is switched off.

It is an object of the invention to provide an improved method for controlling an automatic switch-off and switch-on procedure of a drive unit in a motor vehicle with respect to an automatic switch-on procedure which is optimal with regard to consumption and comfort.

This and other objects are achieved by a method of controlling an automatic switch-off and switch-on procedure of a drive unit in a motor vehicle by use of a start-stop device, by which, when the motor vehicle stops, the drive unit is automatically switched off if predefined switch-off conditions have been met, and by which an automatically switched-off drive unit is automatically switched on if at least one driver-side or system-side switch-on request is made. When a system-side switch-on request takes place, the automatic switch-on procedure will be suppressed at least temporarily if a delay condition exists.

The invention starts out from a conventional method of controlling an automatic switch-off and switch-on procedure of a drive unit in a motor vehicle by way of a start-stop device, by which, when the motor vehicle stops, the drive unit is automatically switched off if predefined switch-off conditions have been met, and by which an automatically switched-off drive unit is automatically switched on if at least one driver-side or system-side switch-on request is made. A driver-side switch-on request is a driver's measure by which he expresses his intension to continue his drive again. This may, for example, be the operation of a clutch for engaging a gear. A system-side switch-on request may take place, for example, when no sufficient air conditioning of the vehicle can be ensured or if the charge state of the battery has fallen below a given threshold or if, in the case of a further discharge, there is the risk that a start can no longer be initiated.

The invention is now based on the problem that, when a drive unit is automatically switched off, a situation may arise that the voltage supply will be strained by active consuming devices, as, for example, the radio, during the stoppage, to such an extent that a system-side switch-on request for starting the drive unit is generated and is sent to the start-stop system in order to prevent a further discharging of the battery. The start-stop system will then automatically restart the engine. On the one hand, this may irritate the driver because he will not know why the drive unit is being restarted and, on the other hand, the preferred automatic start may be unnecessary because the driver would initiate the start anyhow in certain situations and the battery would then be charged.

In order to avoid this problem, it is within the scope of the method of the invention that, when a system-side switch-on request takes place, the automatic switch-on procedure will be suppressed at least temporarily if a delay condition is present; thus, it is initiated in a delayed manner, if required, or is initiated only if a driver-side switch-on request is present.

Since a system-side switch-on request will often take place when an optimal operation of the vehicle in the case of a significantly longer stoppage of the engine can no longer be sufficiently guaranteed, in an advantageous further development of the invention, a delay condition may exist if a driver-side switch-on request is to be expected within a predefined time interval after the system-side switch-on request and/or if an automatic start of the drive unit as a result of a driver assistance system, particularly a cruise control system (for example, a so-called ACC Stop & Go), is to be expected within a predefined time interval. In this case, the time interval may be the same for all system-side switch-on requests, or may be preset individually for every switch-on request. If a driver-side switch-on request and/or the automatic start as a result of a driver assistance system is to be expected in the near future, the start may possibly still be delayed because the threshold values, at whose reaching or falling-below, a system-side start request is emitted, are as a rule selected such that no critical condition of the vehicle will be reached yet if the stoppage time of the engine is slightly longer. If the expected point-in-time of a driver-side switch-on request and/or of the automatic start as a result of a driver assistance system is within the predefined time interval, a suppression of the automatic start will be possible until the actual implementation of the driver-side switch-on request. If, however, the point-in-time that is to be expected of the driver-side switch-on request and/or of the automatic start as a result of a driver assistance system is outside the time interval, the drive unit has to be started immediately because otherwise an optimal operation of the vehicle may possibly no longer be guaranteed.

The point-in-time that is to be expected of a driver-side switch-on request and/or of the automatic start as a result of a driver assistance system can be determined as a function of many different data. Advantageously, the point-in-time, that is to be expected, of a driver-side switch-on request and/or of the automatic start as a result of a driver assistance system, while the drive unit is switched off, is determined as a function of predefined operating values of the motor vehicle, state variables of the motor vehicle, and/or other parameters of the motor vehicle. If, for example, while the drive unit was automatically switched-off, the front passenger door or the trunk was opened, the conclusion can be drawn, when the trunk or the front passenger door are closed, that the entering/exiting/loading or unloading operation has been concluded and the driver would like to soon start driving again.

As an alternative or in addition, the point-in-time, that is to be expected, of a driver-side switch-on request and/or of the automatic start as a result of a driver assistance system, when the drive unit is switched off, can also be determined as a function of vehicle-external information, particularly of data of other traffic participants or concerning other traffic participants, environmental data, and/or traffic engineering data. The traffic engineering data may particularly comprise data of traffic light systems which contain information concerning the point-in-time of a change of state. If it is recognized, for example, by means of traffic engineering data that the traffic light will switch back to green in the foreseeable future, it can be assumed that the driver will soon want to start driving. Thus, an automatic start of the drive unit, which is to be carried out on the basis of a system-side switch-on request, can be delayed or can be prevented pending the arrival of a driver-side switch-on request. The vehicle-external information can be determined and/or made available by a navigation system, an image-reproducing environment monitoring system, a traffic engineering communications system, and/or a car-to-car communications system.

By means of the above-mentioned vehicle information and/or the vehicle-external data, not only the point-in-time of the initiation of an automatic start but also the carrying-out of a switch-off procedure can be influenced. In order to be able to ensure, for example, a sufficient stoppage time until a switch-on request takes place, it may be that, before the initiation of an automatic switch-off procedure of the drive unit, a stoppage duration of the drive unit is forecast that is possible when taking into account current operating values of the vehicle, state variables of the vehicle, other parameters of the vehicle, and/or vehicle-external information or data. If all other switch-off conditions have been met, an automatic switch-off procedure will then be permitted or prevented as a function of the forecast stopping duration. Therefore, if all other switch-off conditions have been met, an automatic switch-off procedure is advantageously initiated if the forecast stopping duration is at least no less than a predefined stopping duration limit value, which, if necessary, may also be variable. If the forecast stopping duration is less than the possibly freely applicable stopping duration limit, however, no automatic switch-off procedure will be permitted.

If the vehicle is additionally equipped with a cruise control system, the speed can also be adapted correspondingly while the above-mentioned vehicle-external data are taken into account, so that the consumption will be favorable. In particular, when the vehicle approaches a traffic light, the speed in the run-up can be correspondingly adapted, so that, at the point-in-time of the light change to green, the vehicle can easily continue to drive.

The method according to the invention as well as its advantageous further developments can be implemented by way of an implemented algorithm or a corresponding module arrangement in a control device provided for this purpose, particularly in an engine control unit or an air-conditioning control unit.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
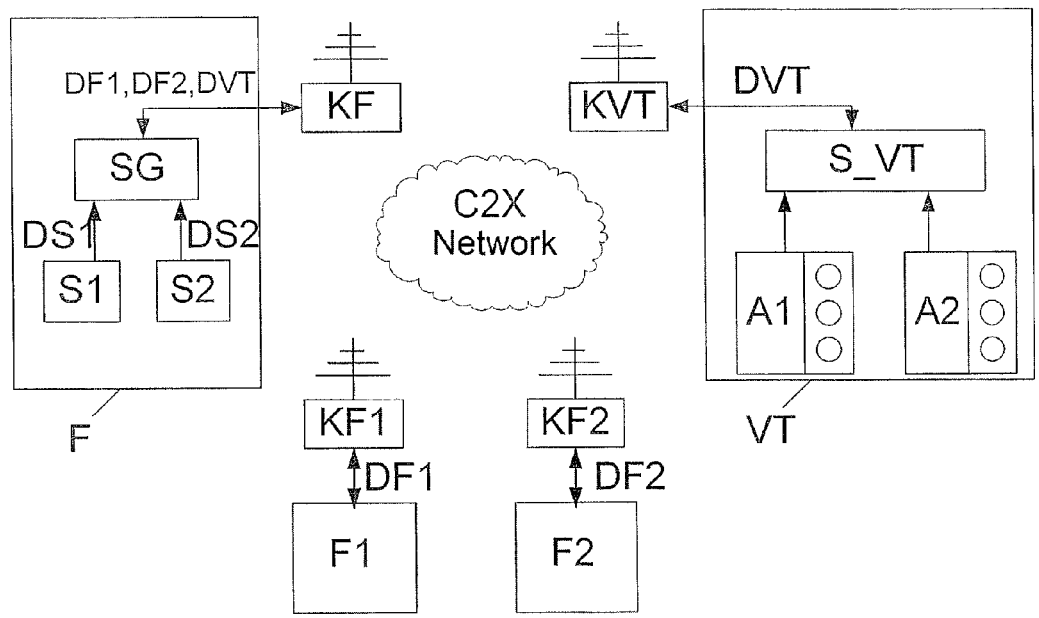
FIG. 1 is a schematic diagram of a data exchange between different vehicles and traffic engineering systems for the transmission of all relevant data for the implementation of an automatic switch-on procedure of an automatically switched-off drive unit.

FIG. 1 illustrates a vehicle F which is equipped with a start-stop device for implementing an automatic switch-off and switch-on procedure of a drive unit. The implementation of the automatic switch-off and switch-on procedures is controlled by way of a control device SG. The control device SG contains all data or information required for initiating the automatic switch-off and switch-on procedures. This information can be subdivided into 3 groups:
1. Vehicle-internal data DS1 and DS2,
2. Vehicle-external data of a traffic engineering system VT
3. Vehicle-external data of other traffic participants F1 and F2.

The vehicle-internal data may be operating values of the motor vehicle (speed, gear selection, engine oil temperature, coolant temperature, outside temperature, onboard power supply voltage), state variables of the motor vehicle and/or other parameters of the motor vehicle. As an example, two sensors S1 and S2 are illustrated in the schematic diagram and send corresponding signals DS1 and DS2, as, for example, the current speed or a signal of a logic for detecting seat occupation, to the control device SG.

The vehicle F is further equipped with a communications unit KF for sending vehicle-internal data and for receiving vehicle-external data of other traffic participants F1 and F2 and/or of a traffic engineering system VT. Likewise, the additional traffic participants F1 and F2 illustrated here, as well as a traffic engineering system VT to be explained later, are equipped with a corresponding communications unit KF1, KF2 and KVT for receiving and emitting relevant data DF1, DF2 and DVT. The data transmission between the individual systems takes place via a C2X network (not shown here in detail).

The traffic data engineering system VT is, for example, a traffic light arrangement having two traffic light systems A1 and A2, which are controlled by a traffic light control unit S_VT. This traffic light control unit S_VT sends, among others, data DVT of the traffic light arrangement to the communications unit KVT which contain information concerning the point-in-time of a state variable. The communications unit KVT emits its data DVT so that the latter can be received by the communications unit KF of the vehicle F, which contains the start-stop unit.

Analogously, the two traffic participants F1 and F2 send their relevant data DF1 and DF2 (for example, position, speed, state of the drive unit, . . . ) to their communications unit KF1 or KF2, which emits the data DF1 and DF2, so that they can be received by the communications unit KF of the vehicle F which contains the start-stop unit.

Furthermore, vehicle-external environmental data of an environment monitoring unit can also be sent to the control device SG by means of sensors mounted on the vehicle F.

Thus, in addition to the vehicle-internal data DS1 and DS2, all vehicle-external data DF1, DF2 and DVT, relevant to the initiation or non-initiation of an automatic switch-off and switch-on procedure, are also available to the vehicle F. Based on these data, the control device SG can decide whether and when an automatic switch-off procedure and switch-on procedure makes sense.

Figure 2:
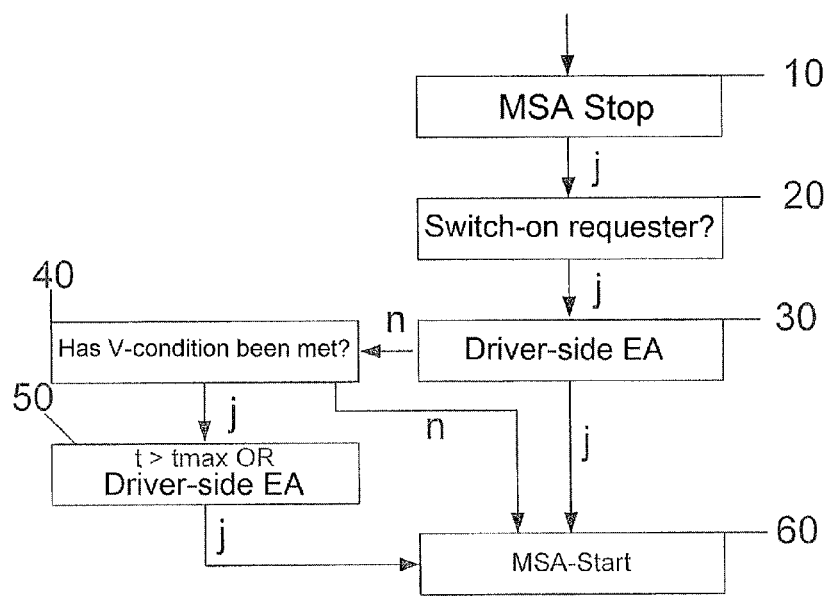
FIG. 2 is a simplified flow chart for illustrating exemplary method according to the invention.

By means of FIG. 2, an embodiment of the method according to the invention for the automatic switching-off and switching-on of a drive unit via a start-stop system will now be explained in detail. The flow chart begins at Step 10 in which it is checked whether the drive unit was automatically switched off, in which case it is assumed that an automatic switch-off procedure is initiated if all switch-off conditions have been met. As explained above, in this case, in addition to the vehicle-internal data, all available vehicle-external data can also be taken into account.

If the drive unit was automatically switched off, a switch-on request will be awaited in the next Step 20. This may be a driver-side switch-on request (for example, when the driver wants to start driving again and therefore steps on an existing clutch pedal for engaging a gear), or it may be a system-side switch-on request because of a low state of charge of the battery. If a switch-on request is detected, it is checked in Step 30 whether it is a system-side switch-on request or a driver-side switch-on request. If a driver-side switch-on request is present, an immediate transition is made to Step 60 and the drive unit is automatically started, so that the driver can start driving as he wishes.

However, if no driver-side switch-on request is present (but a system-side switch-on request is present), a transition is made to Step 40, and it is queried whether a delay condition is present or has been met. A delay condition may be present if it was determined that a driver-side switch-on request is to be expected within a predefined time interval or if it is known that a continued drive will soon be possible and the engine will therefore be automatically started in the foreseeable future in order to draw the driver's attention to this fact. The point-in-time of a driver-side switch-on request, that is to be expected, may, for example, be determined by means of various vehicle-internal and vehicle-external data. If the vehicle is currently situated in front of a red traffic light, it can be determined, for example, by means of a traffic light signal, which indicates the point-in-time of a change of state of the traffic light from red to green, when the driver will probably want to start driving again because the traffic light has switched to green.

If only the point-in-time of the driver-side switch-on request, that is to be expected, is not within the predefined time interval (i.e. the delay condition has not been met), then an immediate transition takes place to Step 60 and the drive unit is started on the basis of the present system-side switch-on request.

However, if the point-in-time of the driver-side switch-on request, that is to be expected, is within the predefined time window, the occurrence of the driver-side switch-on request will be awaited in Step 50. In order to prevent the vehicle from arriving in a critical operating condition at the assumed point-in-time because of a non-occurring driver-side switch-on request in which the vehicle can no longer be started (because the battery has been discharged too far, for example), a timer t will be started simultaneously. If a predefined time limit tmax has been reached without a driver-side switch-on request occurring, then the drive unit will be started in a delayed manner despite the absent driver-side switch-on request. The process illustrated in FIG. 2 begins again as soon as the drive unit is automatically switched off again.

With this method, on the one hand, a predefined minimum stop duration can be reached in almost all circumstances and, on the other hand, it can simultaneously be prevented, that the driver becomes insecure as a result of a frequent switching-on again of the drive unit after a brief stoppage duration. The taking into account of vehicle-external data, particularly of traffic light state data, permits a significantly higher-precision control of the automatic switch-off and switch-on procedures. By means of the knowledge of when, for example, a traffic light will probably change its state the next time, it can, on the one hand, be estimated much better whether a switching-off of the internal-combustion engine makes sense in the respective situation. Likewise, the premature starting of the engine because of the decreasing onboard power supply voltage can be delayed when it can be foreseen that a drive will soon continue anyhow.

In addition to influencing an optimal engine start and engine stop strategy, these (traffic light) data can also influence other systems. If, for example, the traffic light assistant signals that the next traffic light will definitely be reached during a red phase, the engine control unit, while taking into account vehicle-internal data, can compute at which distance the driver has to release the accelerator in order to consume as little gasoline as possible by utilizing the engine drag torque or by a sail mode. If, in addition to the traffic light data, position data of other vehicles in one's own traffic lane are also available, the speed adaptation can be computed even more precisely. The determined information can be indicated to the driver in the instrument cluster or head-up display. In the case of vehicles with active cruise control systems, the computation of the optimal speed or operating strategy of the engine can be forwarded directly, and the controlling can be carried out correspondingly. If the vehicle is additionally equipped with an electric motor/generator, the required braking torque can be increased with the assistance of the electric motor/generator and the recuperated energy can be fed into the onboard power supply system.

Summarizing, these aspects all result in a reduction of the fuel consumption, an increase of the traffic flow efficiency, as well as in a reduction of pollutant and noise emissions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of controlling an automatic switch-off and switch-on procedure of a drive unit in a motor vehicle equipped with a start-stop device, the method comprising the acts of:

automatically switching-off the drive unit of the motor vehicle if predefined switch-off conditions have been met;

automatically switching-on an automatically switched-off drive unit if at least one driver-side switch-on request occurs, wherein the driver-side switch request is a request to automatically switch on the switched-off drive unit that is provided by an operator of the motor vehicle; and if a system-side switch-on request occurs while the drive unit was automatically switched-off, at least temporarily suppressing the automatic switch-on procedure if a delay condition exists, wherein the system-side switch request is a request to automatically switch on the switched-off drive unit that is provided by a system of the motor vehicle without input from the operator.

2. The method according to claim 1, further comprising the acts of:

determining that the delay condition exists if at least one of: (a) a driver-side switch-on request is to be expected within a predefined time interval, and (b) an automatic start of the drive unit as a result of a driver assistance system is to be expected within a predefined time interval.

3. The method according to claim 2, wherein the driver assistance system is a cruise control system of the motor vehicle.

4. The method according to claim 2, wherein a point-in-time of the at least one of the driver-side switch-on request and the automatic start as a result of the driver assistance system that is to be expected, while the drive unit is switched off, is determined as a function of at least one of: (a) predefined operating values of the motor vehicle, (b) state variables of the motor vehicle, and (c) other parameters of the motor vehicle.

5. The method according to claim 4, wherein a point-in-time of the at least one of the driver-side switch-on request and the automatic start as a result of the driver assistance system that is to be expected, while the drive unit is switched off, is determined as a function of at least one of: (a) vehicle-external information, (b) environmental data, and (c) traffic engineering data.

6. The method according to claim 5, wherein the traffic engineering data comprises traffic light arrangement data, said traffic light arrangement data containing information concerning a point-in-time of a change of state.

7. The method according to claim 6, wherein the vehicle-external information is obtained by at least one of: (a) a navigation system, (b) an image-reproducing environment monitoring system, (c) a traffic engineering communication system, and (d) a vehicle-to-vehicle communication system.

8. The method according to claim 2, wherein a point-in-time of the at least one of the driver-side switch-on request and the automatic start as a result of the driver assistance system that is to be expected, while the drive unit is switched off, is determined as a function of at least one of: (a) vehicle-external information, (b) environmental data, and (c) traffic engineering data.

9. The method according to claim 8, wherein the vehicle-external information is data of other traffic participants with the motor vehicle.

10. The method according to claim 8, wherein the traffic engineering data comprises traffic light arrangement data, said traffic light arrangement data containing information concerning a point-in-time of a change of state.

11. The method according to claim 8, wherein the vehicle-external information is obtained by at least one of: (a) a navigation system, (b) an image-reproducing environment monitoring system, (c) a traffic engineering communication system, and (d) a vehicle-to-vehicle communication system.

12. The method according to claim 1, wherein before initiating the automatic switch-off procedure of the drive unit, the method further comprising the acts of:

forecasting a potential stoppage duration of the drive unit factoring into account at least one of current operating values of the vehicle, state variables of the vehicle, other parameters of the vehicle, and vehicle-external information; and as a function of the forecast potential stopping duration, initiating the automatic switch-off procedure if all other switch-off conditions have been met.

13. The method according to claim 1, further comprising the acts of:

as a function of at least one of predefined operating values of the motor vehicle, state variables of the motor vehicle, other parameters of the motor vehicle, vehicle-external information, environmental data, and traffic engineering data, computing an optimal operating strategy of the drive unit; and controlling the drive unit to carry out the computed optimal operating strategy.

14. A method of operating a start-stop device in a motor vehicle having a drive unit, the method comprising the acts of:

in an automatically switched-off state of the drive unit, determining whether a driver's-side or system-side switch-on request occurs, wherein the driver-side switch request is a request to automatically switch on the switched-off drive unit that is provided by an operator of the motor vehicle, and wherein the system-side switch request is a request to automatically switch on the switched-off drive unit that is provided by a system of the motor vehicle without input from the operator; and when the system-side switch-on request occurs, delaying the automatic switching-on of the drive unit based upon an existing delay condition.

15. The method according to claim 14, further comprising the act of:
   determining an existing delay condition when a driver-side switch-on request is anticipated within a predefined time interval.

16. The method according to claim 15, wherein the anticipated point-in-time at which the driver's-side switch-on request is to occur is determined as a function of predefined operating values of the motor vehicle, state variables of the motor vehicle, other parameters of the motor vehicle, vehicle-external information, environmental data, and/or traffic engineering data.

17. The method according to claim 14, further comprising the act of:
   determining an existing delay condition when an automatic start of the drive unit due to a driver assistance system is anticipated within a predefined time interval.

18. The method according to claim 17, wherein the anticipated point-in-time at which the driver's-side switch-on request is to occur is determined as a function of predefined operating values of the motor vehicle, state variables of the motor vehicle, other parameters of the motor vehicle, vehicle-external information, environmental data, and/or traffic engineering data.

* * * * *